United States Patent
Solovyeva et al.

(10) Patent No.: US 12,435,622 B2
(45) Date of Patent: Oct. 7, 2025

(54) IDENTIFYING DRILL CUTTINGS WITH TRACER PILLS

(71) Applicant: Saudi Arabian Oil Company, Dhahran (SA)

(72) Inventors: Vera Solovyeva, Moscow (RU); Vladimir Khmelnitskiy, Moscow (RU); Vyacheslav Grokhovsky, Moscow (RU); Nouf AlJabri, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/453,635

(22) Filed: Aug. 22, 2023

(65) Prior Publication Data

US 2025/0067169 A1 Feb. 27, 2025

(51) Int. Cl.
 *E21B 43/34* (2006.01)
 *E21B 47/11* (2012.01)
(52) U.S. Cl.
 CPC .................................. *E21B 47/11* (2020.05)
(58) Field of Classification Search
 CPC ............ E21B 47/11; E21B 43/34; C09K 8/34
 USPC ..................................................... 166/250.12
 See application file for complete search history.

(56) References Cited

U.S. PATENT DOCUMENTS

| | | |
|---|---|---|
| 5,892,147 A | 4/1999 | Garnes et al. |
| 8,877,506 B2 | 11/2014 | Roberts et al. |
| 10,377,938 B2 * | 8/2019 | Sarkar ..................... C09K 8/03 |
| 10,434,222 B2 | 10/2019 | Roof et al. |
| 11,084,966 B2 | 8/2021 | Burns et al. |
| 2003/0230819 A1 | 12/2003 | Park et al. |
| 2012/0015852 A1 | 1/2012 | Quintero et al. |
| 2012/0178653 A1* | 7/2012 | McClung, III .......... E21B 47/11 977/734 |

(Continued)

FOREIGN PATENT DOCUMENTS

| | | |
|---|---|---|
| CA | 2419115 | 3/2011 |
| CA | 2851237 | 5/2013 |

(Continued)

OTHER PUBLICATIONS

Allard et al., "Core-shell type dually fluorescent polymer nanoparticles for ratiometric pH-sensing," Journal of Polymer Science: Part A: Polymer Chemistry, 2008, 46(18):6206-6213, 8 pages.

(Continued)

*Primary Examiner* — William D Hutton, Jr.
*Assistant Examiner* — Ashish K Varma
(74) *Attorney, Agent, or Firm* — Fish & Richardson P.C.

(57) ABSTRACT

Techniques for identifying drill cuttings include drilling a wellbore; during the drilling, circulating a drilling fluid that includes a plurality of tracer pills, where each tracer pill includes a shell or coating formed of a thermoresponsive material and a tracer material enclosed within the shell; during the drilling, removing cuttings such that the cuttings become entrained within the drilling fluid; attaching the tracer material of the tracer pills to the cuttings entrained within the drilling fluid by releasing the tracer material from the shells; and circulating the drilling fluid including the cuttings with the attached tracer material through the wellbore and uphole toward a terranean surface.

24 Claims, 4 Drawing Sheets

(56) References Cited

U.S. PATENT DOCUMENTS

| | | | |
|---|---|---|---|
| 2013/0017610 | A1 | 1/2013 | Roberts et al. |
| 2018/0110736 | A1 | 4/2018 | Hung et al. |
| 2019/0368336 | A1* | 12/2019 | Hammond .............. E21B 47/11 |
| 2020/0031738 | A1 | 1/2020 | Al-Jabri et al. |
| 2020/0032148 | A1 | 1/2020 | Al-Jabri et al. |
| 2020/0116019 | A1* | 4/2020 | Ow .................... G01N 33/2882 |
| 2020/0208513 | A1 | 7/2020 | Al-Qasim et al. |
| 2022/0056329 | A1* | 2/2022 | AlJabri ................. C09K 11/06 |
| 2023/0141956 | A1 | 5/2023 | Chen et al. |
| 2023/0148198 | A1 | 5/2023 | Wang et al. |

FOREIGN PATENT DOCUMENTS

| | | |
|---|---|---|
| EP | 2097072 | 1/2011 |
| GB | 2489714 | 10/2012 |
| WO | WO 2001045635 | 6/2001 |
| WO | WO 2012115717 | 8/2012 |
| WO | WO 2014051789 | 4/2014 |
| WO | WO 2014060562 | 4/2014 |
| WO | WO 2014207075 | 12/2014 |
| WO | WO 2017064481 | 4/2017 |
| WO | WO 2017136641 | 8/2017 |
| WO | WO 2018085504 | 5/2018 |
| WO | WO 2018234431 | 12/2018 |

OTHER PUBLICATIONS

Behnke et al., "Encapsulation of Hydrophobic Dyes in Polystyrene Micro- and Nanoparticles via Swelling Procedures," Journal of Fluorescence, 2011, 21(3):937-944, 8 pages.

Deschamps et al., "Drilling to the Extreme: the Micro-Coring Bit Concept," IADC/SPE 115187, presented at the IADC/SPE Asia Pacific Drilling Technology Conference and Exhibition, Jakarta, Indonesia, Aug. 25-27, 2008, 12 pages.

Desmette et al., "Drilling Hard and Abrasive Rock Efficiently, or Generating Quality Cuttings? You No Longer Have to Choose . . . ," SPE 116554, Society of Petroleum Engineers, 2008 SPE Annual Technical Conference and Exhibition, Denver, Colorado, Sep. 21-24, 2008, 19 pages.

Eeckman et al., "Evaluation of a new controlled-drug delivery concept based on the use of thermoresponsive polymers," International Journal of Pharmaceutics, Apr. 2002, 241(1):113-125, 13 pages.

elveflow.com [online], "Syringe pumps and microfluidics," 2021, retrieved Nov. 10, 2021 from URL <https://www.elveflow.com/microfluidic-reviews/microfluidic-flow-control/syringe-pumps-and-microfluidics/>, 7 pages.

Georgi, et al., "Advances in Cuttings Collection and Analysis," SPWLA 34th Annual Logging Symposium, Jun. 13-16, 1993, 20 pages.

Guo et al., "Generation of ultra-thin-shell microcapsulates using osmolarity—controlled swelling method," Micromachines, Apr. 2020, 11(4):444, 10 pages.

Kashani et al., "Microfluidics for core-shell drug carrier particles—A review," RSC Advances, 2021, 11:229-249, 21 pages.

Martin et al., "Improved Water-Soluble Polymers for Enhanced Recovery of Oil," presented at the International Symposium on Oilfield and Geothermal Chemistry, Denver, Colorado, Jun. 1-3, 1983, 14 pages.

Miranda et al., "Stability and Mobility of Functionalized Silica Nanoparticles for Enhanced Oil Recovery Applications," presented at the SPE International Oilfield Nanotechnology Conference and Exhibition, Noordwijk, The Netherlands, Jun. 12-14, 2012, 11 pages.

Moon et al., "Packaging vertically aligned carbon nanotubes into a heat-shrink tubing for efficient removal of phenolic pollutants," Royal Society of Chemistry Advances, Jul. 2019, 9(39):22205-22210, 6 pages.

Musyanovych et al., "Preparation of Biodegradable Polymer Nanoparticles by Miniemulsion Technique and Their Cell Interactions," Macromolecular Bioscience, Feb. 2008, 8(2):127-139, 13 pages.

Nabavi et al., "Mechanisms and control of single-step microfluidic generation of multi-coare double emulsion droplets," Chemical Engineering Journal, Apr. 2017, 322:140-148, 9 pages.

Poitzsch et al., "Nanoparticle Tags for Improved Depth Correlation," IPTC-19785, International Petroleum Technology Conference (IPTC), IPTC Conference 2020, 2 pages (abstract only).

Reisch et al., "Fluorescent Polymer Nanoparticles Based on Dyes: Seeking Brighter Tools for Bioimaging," Small, Apr. 2016, 12(15):1968-1992, 25 pages.

Santarelli et al., "Formation Evaluation From Logging on Cuttings," SPE Reservoir Evaluation and Engineering, presented at the 1996 SPE Permian Basin Oil and Gas Recovery Conference, Mar. 27-29, 1996, 7 pages.

Selvam et al., "Thermo-Sensitive Nanogels for Targeted Tracer Release in Push and Pull Operations," presented at the SPE Improved Oil Recovery Conference, held virtually, Aug. 31-Sep. 4, 2020, 9 pages.

SyringePump.com [online], "Syringe-heaters featuring thermo-kinetic heat clamping," 2021, retrieved Oct. 19, 2021 from URL <https://syringepumps.com/heater.php>, 2 pages.

Vollrath et al., "Fluorescence imaging of cancer tissue based on metal-free polymeric nanoparticles—a review," Journal of Materials Chemistry B, Mar. 2013, 1(15):1994-2007, 15 pages.

Ward et al., "Thermoresponsive Polymers for Biomedical Applications," Polymers, Aug. 2011, 3(3):1215-1242, 28 pages.

Whelehan et al., "Microencapsulation using vibrating technology," Journal of Microencapsulation, Nov. 2011, 28(8):669-688, 21 pages.

Xing et al., "CO 2 -Soluble Surfactants for Improved Mobility Control," presented at the SPE Improved Oil Recovery Symposium, Tulsa, Oklahoma, Apr. 24-28, 2010, 21 pages.

Yin et al., "Droplet generation in a flow-focusing microfluidic device with external mechanical vibration," Micromechanics, Jul. 2020, 11(8):743, 13 pages.

Zakharchenko et al., "Temperature controlled encapsulation and release using partially biodegradable thermo-magneto-sensitive self-rolling tubes," Soft Matter, Apr. 2010, 6(12):2633, 4 pages.

International Search Report and Written Opinion in International Appln. No. PCT/US2024/043050, mailed on Dec. 23, 2024, 19 pages.

* cited by examiner

IDENTIFYING DRILL CUTTINGS WITH TRACER PILLS

TECHNICAL FIELD

This disclosure relates to systems and methods for identifying drill cuttings with tracer pills and, more particularly, with tracer pills that include a thermoresponsive material coating.

BACKGROUND

Solid materials are among the most common active form of oilfield chemicals including bactericides, surfactants, corrosion inhibitors, scale dissolvers, tracers, and other materials. Targeted delivery of these materials and their efficient release at the point of action are important for the focused treatment of drilling and production issues while selectively impacting targeted reservoir zones.

SUMMARY

In an example implementation, a method of identifying drill cuttings includes drilling at least a portion of a wellbore from a terranean surface and into a subterranean formation by rotating a drill bit on a drill string; during the drilling, circulating a drilling fluid through the drill string and the drill bit, the drilling fluid including a plurality of tracer pills, where each tracer pill includes a shell or coating formed of a thermoresponsive material and a tracer material enclosed within the shell; during the drilling, removing cuttings from the subterranean formation with the rotating drill bit such that the cuttings become entrained within the drilling fluid; attaching the tracer material of at least some of the plurality of tracer pills to the cuttings entrained within the drilling fluid by releasing the tracer material from the shells; and circulating the drilling fluid including the cuttings with the attached tracer material through the wellbore and uphole toward the terranean surface.

In an aspect combinable with the example implementation, releasing the tracer material includes degrading or dissolving the thermoresponsive material of the shells of the at least some of the plurality of tracer pills based on a temperature within the wellbore at the subterranean formation.

In another aspect combinable with any of the previous aspects, releasing the tracer material includes opening the shell of the at least some of the plurality of tracer pills through contact between the at least some of the plurality of tracer pills and at least one of the drill bit or the subterranean formation.

In another aspect combinable with any of the previous aspects, releasing the tracer material includes degrading or dissolving the thermoresponsive material of the shells of the at least some of the plurality of tracer pills based on a temperature within the wellbore at the subterranean formation; and opening the shell of the at least some of the plurality of tracer pills through contact between the at least some of the plurality of tracer pills and at least one of the drill bit or the subterranean formation.

Another aspect combinable with any of the previous aspects further includes analyzing the cuttings with the attached tracer material at the terranean surface through an optical analyzer.

In another aspect combinable with any of the previous aspects, the plurality of tracer pills are a first plurality of tracer pills, the tracer material is a first tracer material having a first color, and the subterranean formation is a first subterranean formation at a first depth.

Another aspect combinable with any of the previous aspects further includes during the drilling, circulating the drilling fluid through the drill string and the drill bit, where the drilling fluid includes a second plurality of tracer pills that each include a shell or coating formed of the thermoresponsive material and a second tracer material enclosed within the shell, with the second tracer material having a second color different than the first color; during the drilling, removing cuttings from a second subterranean formation with the rotating drill bit such that the cuttings of the second subterranean formation become entrained within the drilling fluid, the second subterranean formation at a second depth different than the first depth; attaching the second tracer material of at least some of the second plurality of tracer pills to the cuttings from the second subterranean formation entrained within the drilling fluid by releasing the second tracer material from the shells; and circulating the drilling fluid including the cuttings from the second subterranean formation with the attached second tracer material through the wellbore and uphole toward the terranean surface.

Another aspect combinable with any of the previous aspects further includes analyzing the cuttings from the first subterranean formation with the attached first tracer material at the terranean surface through an optical analyzer; analyzing the cuttings from the second subterranean formation with the attached second tracer material at the terranean surface through the optical analyzer; and distinguishing the cuttings from the first subterranean formation from the cuttings from the second subterranean formation based on the difference between the first and second colors.

In another aspect combinable with any of the previous aspects, releasing the first tracer material includes degrading or dissolving the thermoresponsive material of the shells of the at least some of the first plurality of tracer pills based on a first temperature within the wellbore at the first subterranean formation, and releasing the second tracer material includes degrading or dissolving the thermoresponsive material of the shells of the at least some of the second plurality of tracer pills based on a second temperature within the wellbore at the second subterranean formation that is different than the first temperature.

In another aspect combinable with any of the previous aspects, the thermoresponsive material includes a thermoplastic polymer.

In another example implementation, a system includes a drilling sub-system configured to drill at least a portion of a wellbore from a terranean surface toward a subterranean formation by rotating a drill bit on a drill string; and a drilling fluid circulation sub-system configured to perform operations. The operations include during the drilling, circulating a drilling fluid through the drill string and the drill bit, where the drilling fluid includes a plurality of tracer pills, and each tracer pill includes a shell or coating formed of a thermoresponsive material and a tracer material enclosed within the shell; during the drilling, removing cuttings from the subterranean formation with the rotating drill bit such that the cuttings become entrained within the drilling fluid; attaching the tracer material of at least some of the plurality of tracer pills to the cuttings entrained within the drilling fluid by releasing the tracer material from the shells; and circulating the drilling fluid including the cuttings with the attached tracer material through the wellbore and uphole toward the terranean surface.

In an aspect combinable with the example implementation, releasing the tracer material includes degrading or dissolving the thermoresponsive material of the shells of the at least some of the plurality of tracer pills based on a temperature within the wellbore at the subterranean formation.

In another aspect combinable with any of the previous aspects, releasing the tracer material includes opening the shell of the at least some of the plurality of tracer pills through contact between the at least some of the plurality of tracer pills and at least one of the drill bit or the subterranean formation.

In another aspect combinable with any of the previous aspects, releasing the tracer material includes degrading or dissolving the thermoresponsive material of the shells of the at least some of the plurality of tracer pills based on a temperature within the wellbore at the subterranean formation; and opening the shell of the at least some of the plurality of tracer pills through contact between the at least some of the plurality of tracer pills and at least one of the drill bit or the subterranean formation.

Another aspect combinable with any of the previous aspects further includes an optical analyzer configured to analyze the cuttings with the attached tracer material at the terranean surface.

In another aspect combinable with any of the previous aspects, the plurality of tracer pills are a first plurality of tracer pills, the tracer material is a first tracer material having a first color, and the subterranean formation is a first subterranean formation at a first depth.

In another aspect combinable with any of the previous aspects, the drilling fluid circulation sub-system is further configured to perform operations including during the drilling, circulating the drilling fluid through the drill string and the drill bit, the drilling fluid including a second plurality of tracer pills, where each tracer pill includes a shell or coating formed of the thermoresponsive material and a second tracer material enclosed within the shell, the second tracer material having a second color different than the first color; during the drilling, removing cuttings from a second subterranean formation with the rotating drill bit such that the cuttings of the second subterranean formation become entrained within the drilling fluid, the second subterranean formation at a second depth different than the first depth; attaching the second tracer material of at least some of the second plurality of tracer pills to the cuttings from the second subterranean formation entrained within the drilling fluid by releasing the second tracer material from the shells; and circulating the drilling fluid including the cuttings from the second subterranean formation with the attached second tracer material through the wellbore and uphole toward the terranean surface.

Another aspect combinable with any of the previous aspects further includes an optical analyzer configured to perform operations including analyzing the cuttings from the first subterranean formation with the attached first tracer material at the terranean surface; analyzing the cuttings from the second subterranean formation with the attached second tracer material at the terranean surface; and distinguishing the cuttings from the first subterranean formation from the cuttings from the second subterranean formation based on the difference between the first and second colors.

In another aspect combinable with any of the previous aspects, releasing the first tracer material includes degrading or dissolving the thermoresponsive material of the shells of the at least some of the first plurality of tracer pills based on a first temperature within the wellbore at the first subterranean formation, and releasing the second tracer material includes degrading or dissolving the thermoresponsive material of the shells of the at least some of the second plurality of tracer pills based on a second temperature within the wellbore at the second subterranean formation that is different than the first temperature.

In another aspect combinable with any of the previous aspects, the thermoresponsive material includes a thermoplastic polymer.

In another example implementation, a method of manufacturing a drill cuttings tracer pill includes filling at least a portion of a volume of a shell formed of a thermoresponsive material with a tracer material, the shell including at least one open end and at least one closed end; and sealing the tracer material within the shell by closing the at least one open end to form a drill cuttings tracer pill.

In an aspect combinable with the example implementation, the thermoresponsive material includes a thermoplastic polymer.

In another aspect combinable with any of the previous aspects, the thermoplastic polymer is selected from the group consisting of polypropylene, polyolefin, fluoropolymer, polyvinyl chloride, neoprene, silicone elastomer, and Viton.

In another aspect combinable with any of the previous aspects, the tracer material includes a solid tracer material.

In another aspect combinable with any of the previous aspects, the tracer material is defined by a particular fluorescent color.

In another aspect combinable with any of the previous aspects, the shell includes a tube having one open end and one closed end, and the step of sealing the tracer material within the shell by closing the at least one open end to form the drill cuttings tracer pill includes sealing the one open end of the tube to enclose the tracer material within the shell.

In another aspect combinable with any of the previous aspects, sealing the one open end of the tube includes heat sealing the one open end of the tube.

In another aspect combinable with any of the previous aspects, the shell includes two hemispheres, each hemisphere having an open end and a closed end, and the step of sealing the tracer material within the shell by closing the at least one open end to form the drill cuttings tracer pill includes sealing the open ends of the two hemispheres together to enclose the tracer material within the shell.

In another aspect combinable with any of the previous aspects, the open ends of the two hemispheres together includes heat sealing the open ends of the two hemispheres together to form a sealed seam of the shell.

Implementations of a systems and methods for identifying drill cuttings with tracer pills according to the present disclosure may include one or more of the following features. For example, implementations according to the present disclosure can more accurately provide mud logging operations to identify cuttings from particular subterranean formations. As another example, implementations according to the present disclosure can provide tracer materials into a drilling fluid to identify drill cuttings without affecting a rheology of the drilling fluid. As a further example, implementations according to the present disclosure can provide a solid wellbore material into a wellbore with a protective shell or coating designed to release the wellbore material at a particular location within the wellbore.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

The present disclosure describes implementations of a tracer pill for drilling operations, as well as methods and systems for manufacturing and delivering multiple tracer pills to a subterranean formation in order to identify drill cuttings from the formation that are returned with the drilling fluid with a tracer material of the tracer pills attached thereto. The tracer material can include fluorescent materials, which when attached to the drill cuttings, can label and identify the drill cuttings according to the depth within the wellbore from which they originate. The tracer pills can include a thermoresponsive material that coats or encloses the tracer material and acts as a degradable or dissolvable shell. In some aspects, the shell, therefore, can act as a thermoset package for portion-wise delivery of a color-specific tracer material therewithin to specific depths within the wellbore. In some aspects, the shell degrades or dissolves according to a depth temperature in the wellbore, with different shells of the tracer pills degrading or dissolving at different temperatures. Although a tracer material is uses as the example delivered material that is enclosed or covered by the shell, other wellbore materials (solid or liquid) can be used according to the present disclosure through a generalized delivery and targeted release mechanism as described. Such a delivery mechanism can allow for a reduction of quantities of applied active materials (solid or liquid). In addition, a targeted release of the materials focuses the impact of the materials at a specific wellbore area (for example, depth or formation) and diminishes any adverse environmental impact (for example, to the formation or drilling fluid).

Figure 1:
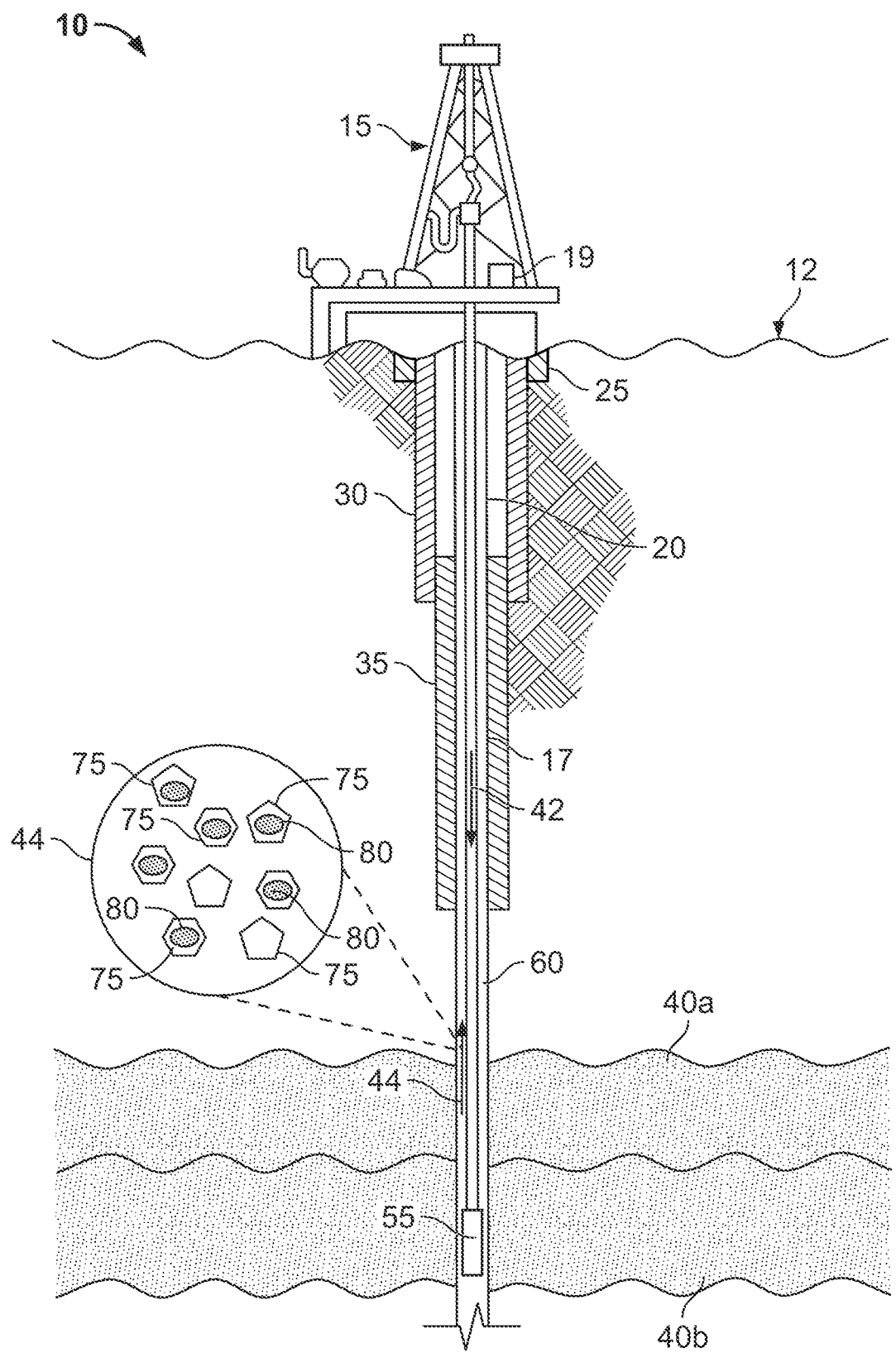
FIG. 1 is a schematic diagram of an example wellbore system that includes a drill string operable to deliver tracer pills within a drilling fluid to identify drill cuttings according to the present disclosure.

FIG. 1 is a schematic diagram of an example wellbore system 10 that operates to deliver tracer pills to one or more locations (in other words, depths) in a wellbore 20 according to the present disclosure. Implementations according to the present disclosure describe a tracer "pill" that, in some aspects, is spherically or pill shaped prior to degradation or dissolution of the shell of the pill. Thus, although the term "pill" refers to a shape that can be generally spherical or capsule shaped, the present disclosure does not exclude tracer pills of different three-dimensional shapes.

Multiple (for example, tens, hundreds, thousands) of tracer pills can be circulated into the wellbore 20 through the drilling string. The tracer pills can be circulated in a drilling or other wellbore fluid through downhole tools, such as conventional rotary assemblies without any special tool on it or through open ended drill pipe. Circulation techniques of the tracer pills can depend, for example, on wellbore diameter, the size of the tools used in the drill string, the number of distinct subterranean formations through which the wellbore 20 is formed, and/or other factors. Thus, implementations of the tracer pills according to the present disclosure can have different external dimensions (lengths, circumferences, or otherwise) in order to have different alternatives for uses.

Tracer pills (such as tracer pills 250 or 310 described herein) can be inserted into the drilling equipment (for example, into a drill pipe or string 17) and circulated downhole during a drilling operation (shown in FIG. 1) along with a drilling fluid. Various types of tracer materials can be included within the tracer pills, such as gases, dyes, salts, isotopes, organic acids, fluorinated chemicals, polymers, and others. However, artificial tracers injected for a survey process could cause negative environmental impact, can be adsorbed by the subterranean formation, or may dissipate due to unexplored underground fractures and flows. Targeted delivery and a specific tracer material's release at a point source can be important to minimize the tracer material's dissipation upon is injection and transport inside the wellbore 20, and thus, to minimize leaks of losses of tracer materials and reduce the detection complications.

Tracer pills (such as tracer pills 250 or 310) that are used in the wellbore system 10 can include an outer shell or coating that encloses a tracer material (solid or liquid or multiphase fluid). The shell or coating can be formed of a thermoresponsive material, such as a polymers and colloids, that degrades, dissolves, or otherwise erodes based on a wellbore temperature, contact with downhole drilling equipment (such as the drill bit) or rock formation, or both. An example thermoresponsive material is poly-N-isopropyl acrylamide (pNIPAAm), which has a lower critical solution temperature, LCST, of around 32° C. Other polymers that can be used as the thermoresponsive material for the shell or coating of tracer pills according to the present disclosure include poly(N,N-diethylacrylamide) (PDEAAm) with an LCST over the range of 25 to 32° C., poly(N-vinlycaprolactam) (PVCL) with an LCST between 25 and 35° C., poly[2-(dimethylamino)ethyl methacrylate](PDMAEMA) with an LCST of around 50° C. and poly(ethylene glycol) (PEG), also called poly(ethylene oxide) (PEO) whose LCST is around 85° C. It is important to note that the LCST of a polymer is dependent on molecular weight and architecture. Among thermoresponsive polymers, poly(N,N-diethylacrylamide) and poly(ethylene glycol) (PEG) have been used in downhole applications but not as a shell or coating for tracer pills such as tracer pills 250 or 310; in other words, not for encapsulation and selective delivery of tracer materials for the purpose of identifying drill cuttings.

As shown, the wellbore system 10 accesses subterranean formations 40a and 40b (as well as other subterranean formation), and provides access to hydrocarbons located in such subterranean formations 40a and 40b. In an example implementation of system 10, the system 10 may be used for a drilling operation as well as to deliver tracer pills (shown in FIGS. 2A and 2B and FIGS. 3A and 3B). As illustrated in FIG. 1, an implementation of the wellbore system 10 includes a drilling assembly 15 deployed on a terranean surface 12. The drilling assembly 15 can be used to form the wellbore 20 extending from the terranean surface 12 and through one or more geological formations in the Earth. One or more subterranean formations, such as subterranean formations 40a and 40b, are located under the terranean surface 12. One or more wellbore casings, such as a surface casing 30 and intermediate casing 35, may be installed in at least a portion of the wellbore 20 (for example subsequent to completion of the drilling operation or some other time).

In some embodiments, the drilling assembly 15 may be deployed on a body of water rather than the terranean surface 12. For instance, in some embodiments, the terranean surface 12 may be an ocean, gulf, sea, or any other body of water under which hydrocarbon-bearing formations may be found. In short, reference to the terranean surface 12 includes both land and water surfaces and contemplates forming and developing one or more wellbore systems 10 from either or both locations.

Generally, as a drilling system, the drilling assembly 15 may be any appropriate assembly or drilling rig used to form wellbores or boreholes in the Earth. The drilling assembly 15 may use traditional techniques to form such wellbores, such as the wellbore 20, or may use nontraditional or novel techniques. In some embodiments, the drilling assembly 15 may use rotary drilling equipment to form such wellbores. Rotary drilling equipment is known and may consist of a drill string 17 and the drill bit 55 (or bottom hole assembly 55 that includes a drill bit). In some embodiments, the drilling assembly 15 may consist of a rotary drilling rig. Rotating equipment on such a rotary drilling rig may consist of components that serve to rotate a drill bit, which in turn forms a wellbore, such as the wellbore 20, deeper and deeper into the ground. Rotating equipment consists of a number of components (not all shown here), which contribute to transferring power from a prime mover to the drill bit itself. The prime mover supplies power to a rotary table, or top direct drive system, which in turn supplies rotational power to the drill string 17. The drill string 17 is typically attached to the drill bit 55 (for example, as a bottom hole assembly). A swivel, which is attached to hoisting equipment, carries much, if not all of, the weight of the drill string 17, but may allow it to rotate freely.

The drill string 17 typically consists of sections of heavy steel pipe, which are threaded so that they can interlock together. Below the drill pipe are one or more drill collars, which are heavier, thicker, and stronger than the drill pipe. The threaded drill collars help to add weight to the drill string 17 above the drill bit to ensure that there is enough downward force on the drill bit 55 to allow the bit to drill through the one or more geological formations. The number and nature of the drill collars on any particular rotary rig may be altered depending on the downhole conditions experienced while drilling.

The drilling fluid circulating system of a rotary drilling operation, such as the drilling assembly 15, may be an additional component of the drilling assembly 15. Generally, the circulating system may cool and lubricate the drill bit 55, removing the cuttings (in other words, bits of rock from subterranean formations 40*a* and 40*b*) from the drill bit 55 and the wellbore 20 (for example, through an annulus 60), and coat the walls of the wellbore 20 with a mud type cake. The circulating system includes drilling fluid 42, which is circulated down through the drill string 17, through the drill bit 55, and returns as drilling fluid 44 (that includes drilling fluid 42, drill cuttings, and tracer material as described herein) throughout the drilling process. Typically, the components of the circulating system include drilling fluid pumps, compressors, related plumbing fixtures, and specialty injectors for the addition of additives to the drilling fluid 42. In some embodiments, such as, for example, during a horizontal or directional drilling process, downhole motors may be used in conjunction with or in the drill bit 55. Such a downhole motor may be a mud motor with a turbine arrangement, or a progressive cavity arrangement, such as a Moineau motor. These motors receive the drilling fluid 42 through the drill string 17 and rotate to drive the drill bit 55 or change directions in the drilling operation.

In many rotary drilling operations, the drilling fluid 42 is pumped down the drill string 17 and out through ports or jets in the drill bit. Returned drilling fluid 44 then flows up toward the surface 12 within annulus 60 between the wellbore 20 and the drill string 17, carrying cuttings (with tracer material attached thereto) in suspension to the surface. The drilling fluid 42, much like the drill bit, may be chosen depending on the type of geological conditions found under subterranean surface 12.

As shown in the circular call-out, returned drilling fluid 44 includes drill cuttings 75 entrained therewithin. The drill cuttings 75 can be bits of subterranean formation 40*a* or subterranean formation 40*b*, depending on the depth of the drill bit 55. As shown, one, some, or all of the drill cuttings 75 can include tracer material 80 attached thereto. Such attachment can be used to identify the drill cuttings 75 from a particular formation based on a color (for example, fluorescent color) of the tracer material 80 in a "mud logging" operation of wellbore system 10. For example, mud logging and accurate drill cuttings depth determination upon drilling of wellbore 20 can be key parameters for efficient well placement for optimal hydrocarbon production from one or more subterranean formations (such as formations 40*a* and 40*b*). Mudd logging and drill cutting identification (according to color of tracer material 80) that are updated as the drilling progresses at the near-real time can provide for prompt decision making and optimization of the drilling directions upon drilling propagation.

In some aspects, the particular color of tracer material 80 can be selected (when manufacturing the tracer pills as described herein) based on a particular depth of a subterranean formation 40*a* or 40*b*. For example, fluorescent tracer material 80 so as to label the drill cuttings 75 by programmed color as cuttings are formed at the drill bit site according to the depth of their origin. Circulation of drilling fluid 44 brings tagged cuttings 75 (in other words, cuttings with tracer material 80 attached thereto) up to the terranean surface where an optical analyzer 19, such as a UV camera with digital image recognition system, can detect the specific fluorescent tag color of the tracer material 80 and assign drill cuttings 75 to particular depth origins accordingly.

Since the tracer pills that enclose the tracer material 80 are injected with drilling fluid 42 and their targeted release is designed to happen at the drill bit 55 (or at a particular depth in the wellbore associated with subterranean formation 40*a* or 40*b* or other formation), to avoid tracer material dissipation during injection, the tracer material 80 is coated or enclosed within the thermoresponsive material as described herein. Some tracer material 80 can include polymeric nanoparticles, fine powders of silica, and/or superabsorbent gels, which can influence the rheology of the drilling fluid 42 if exposed within the fluid 42 during injection or circulation. However, as the tracer material 80 is enclosed within the thermoresponsive material until a desired release at a specific location in the wellbore 20 (for example, based on temperature that location in the wellbore 20), such influencing materials are safe for the drilling operations and may not affect the rheology of the drilling fluid 42.

In some embodiments of the wellbore system 10, the wellbore 20 may be cased with one or more casings. As illustrated, the wellbore 20 includes a conductor casing 25, which extends from the terranean surface 12 shortly into the Earth. A portion of the wellbore 20 enclosed by the conductor casing 25 may be a large diameter borehole. Additionally, in some embodiments, the wellbore 20 may be offset from vertical (for example, a slant wellbore). Even further, in some embodiments, the wellbore 20 may be a stepped wellbore, such that a portion is drilled vertically downward and then curved to a substantially horizontal wellbore portion. Additional substantially vertical and horizontal wellbore portions may be added according to, for example, the type of terranean surface 12, the depth of one or more target subterranean formations, the depth of one or more productive subterranean formations, or other criteria.

Downhole of the conductor casing 25 may be the surface casing 30. The surface casing 30 may enclose a slightly smaller borehole and protect the wellbore 20 from intrusion of, for example, freshwater aquifers located near the terranean surface 12. The wellbore 20 may than extend vertically downward. This portion of the wellbore 20 may be enclosed by the intermediate casing 35.

In some aspects, the drilling assembly 15 (or other portion of the well system 10) may include a control system, for example, a microprocessor-based, electro-mechanical, or otherwise, that may control the drill bit 55. In some aspects, the control system may control one or more pumps, one or more valves, as well as other equipment that is part of or connected to the drilling fluid circulation system. For example, the control system may control a flow rate, pressure, or other circulation criteria of the drilling fluid 42 (and thus, a rate at which tracer pills are circulated with the drilling fluid 42). In some aspects, the control system may also control a composition of the drilling fluid 42 such as, a water percentage of the fluid, or an additive that may be mixed with the drilling fluid 42.

Figure 2B:
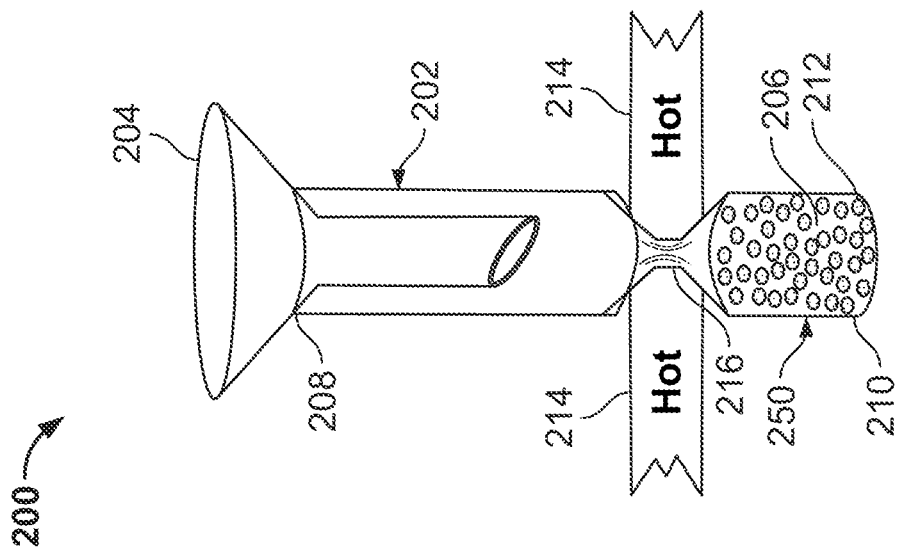
FIGS. 2A and 2B are schematic diagrams showing steps of an example implementation of a method of manufacturing tracer pills according to the present disclosure.
Figure 2A:
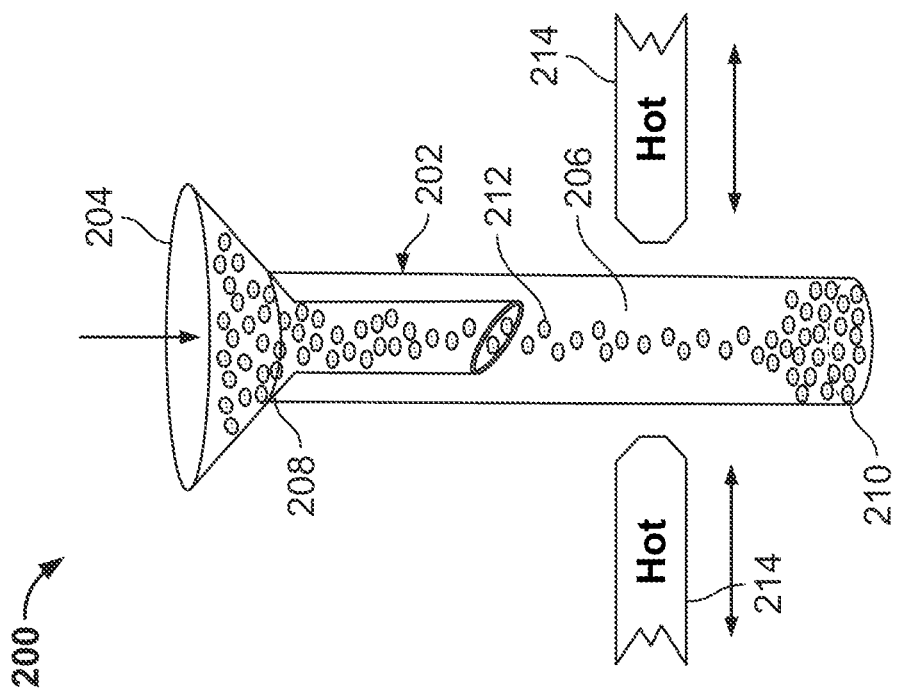

FIGS. 2A and 2B are schematic diagrams showing steps of an example implementation of a method 200 of manufacturing tracer pills according to the present disclosure. FIG. 2A shows a loading step of method 200, where a tracer material 212 (or a particular, selected color) is loaded into an open-ended tube 202 or shell 202, while FIG. 2B shows a sealing step of method 200, where the tracer material 212 is sealed within the shell 202 to form a completed tracer pill 250.

As shown in FIG. 2A, the loading step of method 200 can include a funnel 204 or other device that allows for loading of many (for example, tens, hundreds, thousands) of, in this example, solid particulate tracer material 212 into the shell 202. Here, the shell 202 includes an open end 208 that exposed an inner volume 206 and a closed end 210. The funnel 204 can be inserted into the open end 208 such that tracer material 212 is inserted into the shell 202. A particular amount of tracer material 212 can be filled into the shell 202, such as depending on a desired size or buoyancy of the tracer pill 250.

The shell 202 is made of a thermoresponsive material as described and can act much like a heat-shrink tube. Turning to FIG. 2B, in the sealing step of method 200, the tracer pill 250 can be formed by creating a seal 216 with, for example, heat 214 applied to melt the thermoresponsive material of the shell 202. The heat 214 can be applied, for example, by clamps or tweezers. The tracer pill 250 can then be removed from the portion of the shell 202 above the seal 216, leaving an amount of tracer material 212 within the volume 206 of the tracer pill 250.

Figure 3B:
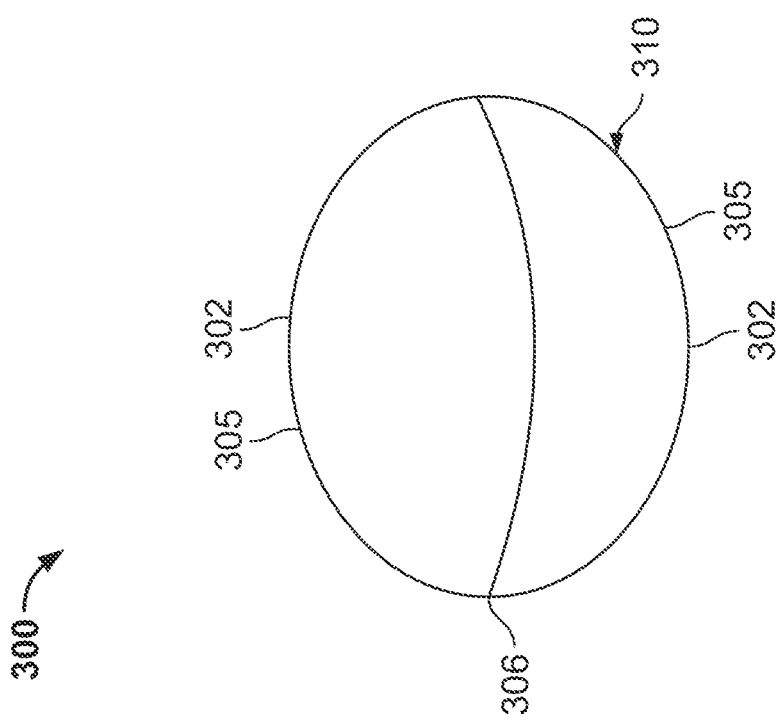
FIGS. 3A and 3B are schematic diagrams showing steps of another example implementation of a method of manufacturing tracer pills according to the present disclosure.
Figure 3A:
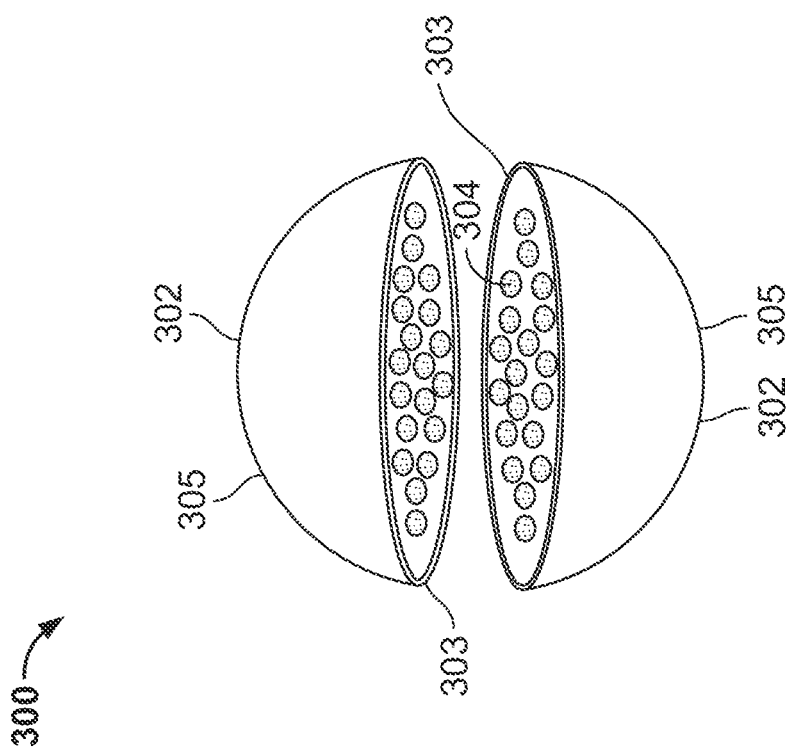

FIGS. 3A and 3B are schematic diagrams showing steps of another example implementation of a method 300 of manufacturing tracer pills according to the present disclosure. FIG. 3A shows a loading step of method 300, where a tracer material 304 (or a particular, selected color) is loaded into one or both of two shell hemispheres 302. Each shell hemisphere 302 includes an open-end 303 and a closed end 305. FIG. 3B shows a sealing step of method 300, where the tracer material 212 is sealed within a shell formed by joining the two hemispheres 302 to form a completed tracer pill 310.

As shown in FIG. 3A, the loading step of method 300 can include the loading of many (for example, tens, hundreds, thousands) of, in this example, solid particulate tracer material 304 into one or both of the hemispheres 302 through the open ends 303. A particular amount of tracer material 304 can be filled into the hemispheres 302, such as depending on a desired size or buoyancy of the tracer pill 310.

The hemispheres 302 are made of a thermoresponsive material as described and can act much like a heat-shrink tube. Turning to FIG. 3B, in the sealing step of method 300, the tracer pill 310 can be formed by creating a seal 306 with, for example, heat applied to melt the thermoresponsive material of the open ends 303 of the hemispheres 302 when brought together. As another example, an adhesive can create the seal 306. The tracer pill 310 is then formed and encloses the tracer material 304 within a volume created by joining the two hemispheres 302.

The size and/or buoyancy (for example, within drilling fluid 42) of either of tracer pills 250 or 310 can be controlled. For example, the tracer pills 250 or 310 can be further treated (for example, at room or elevated temperatures) to yield pills of a particular size via packing and/or compressing the pills more loosely or densely according to a size of drill bit nozzle to be used in the well system 10. Additionally, by controlling initial pill size, temperature and time of the heat exposure upon sealing the shell, tracer pills of various density can be formed. Controllable density of the tracer pills 250 or 310 (or both) can be important to match the buoyancy of the given portion of tracer pills with a density of the drilling fluid 42 used at a given depth in the wellbore 20. If such way of buoyance control would not yield the required tracer pill density within the drilling fluid 42, mixing tracer material with high-specific gravity powders can be used for additional weighting of the tracer pills. Example gravity powders can include, for example, barite, micromax, ilmenite, and hematite.

As noted, shell 202 and hemispheres 302 are made from a thermoresponsive material. As an example, a thermoplastic polymer can be used. Examples of thermoplastic polymers include polyethylene, polypropylene, polyolefin, fluoropolymer (such as FEP, PTFE, PVDF, or Kynar), polyvinyl chloride, neoprene, silicone elastomer, Viton, and others.

Figure 4:
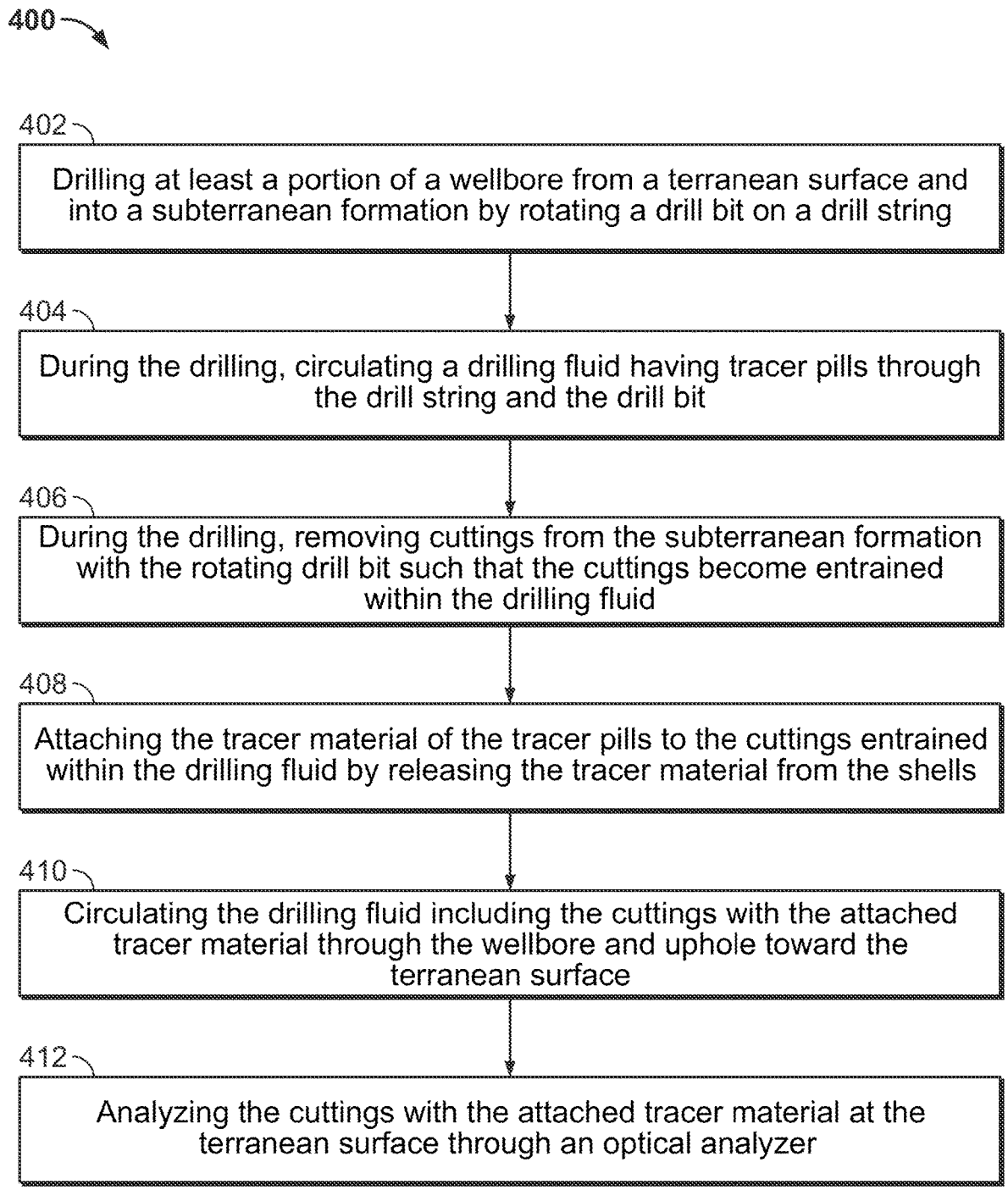
FIG. 4 is a flowchart that describes an example method of identifying drill cuttings with tracer pills according to the present disclosure.

FIG. 4 is a flowchart that describes an example method 400 of identifying drill cuttings with tracer pills according to the present disclosure. In some aspects, method 400 can be performed with well system 100, including tracer pills 250 or tracer pills 310 (or both types). Method 400 can begin at step 402, which includes drilling at least a portion of a wellbore from a terranean surface and into a subterranean formation by rotating a drill bit on a drill string. For example, well system 10 can be used to drill wellbore 20 with the drill bit 55 that is rotated on the drill string 17 to cut through, for example, one or more subterranean formations 40a and 40b. Drilling fluid 42 can be circulated through the drill string 17 to the drill bit 55 during the drilling procedure in order to lubricate the drill bit 55 as well as carry drill cuttings 75 out of the wellbore 20 through the annulus 60.

Method 400 can continue at step 404, which includes, during the drilling, circulating a drilling fluid having tracer pills through the drill string and the drill bit. For example, tracer pills (250 or 310 or other pills according to the present disclosure) can be entrained in the drilling fluid 42 and carried to the drill bit 55 with the fluid 42, where they are released into the wellbore 20 during the drilling process. The tracer pills can be circulated in the drilling fluid 42 to be released into the wellbore 20 at a particular location or depth, such as at or near subterranean formation 40a. As described, the tracer pills (250 or 310) include a shell (202 or 302) formed of a thermoresponsive material that encloses tracer material (212 or 304). The thermoresponsive material acts to enclose and protect the tracer material (212 or 304) so that the tracer material is not released into the drilling fluid 42 during circulation through the drill string 17 or prior to release into the wellbore 20. The tracer material (212 or 304) can be colored with a particular color (for example, fluorescent color) that is to be associated with the particular subterranean formation or depth at which the tracer pills are to be released into the wellbore 20.

Method 400 can continue at step 406, which includes, during the drilling, removing cuttings from the subterranean formation with the rotating drill bit such that the cuttings become entrained within the drilling fluid. For example, the drill cuttings 75 become entrained within the drilling fluid 42 (and in return drilling fluid 44) through the process of drilling through the rock of the subterranean formation 40a (or other formations). Generally, the drill cuttings 75 are representative of the geology of the subterranean formation through which the drill bit 55 is cutting.

Method 400 can continue at step 408, which includes attaching the tracer material of the tracer pills to the cuttings entrained within the drilling fluid by releasing the tracer material from the shells. For example, in some aspects, the tracer material (212 or 304) can be released from the shells (202 or 302) of the tracer pills (250 or 310) by heat generated in the wellbore 20. For instance, the thermoresponsive material of the shells (202 or 302) can be selected to degrade or erode at a particular temperature of, for example, the wellbore 20 at the depth of subterranean formation 40a. Once degraded or dissolved, the shells (202 or 302) release the tracer material (212 or 304), which attaches to the drill cuttings 75 (and is shown as tracer material 80 in FIG. 1).

Alternatively or additionally to being released by heat, the tracer material (212 or 304) can be released from the shells (202 or 302) of the tracer pills (250 or 310) by contact between the tracer pills and the drill bit 55 and/or the rock of the subterranean formation, itself, during the drilling process. For instance, the thermoresponsive material of the shells (202 or 302) can be selected to erode or be removed by the contacting action of the drill bit 55 grinding the rock of the formation, with the tracer pills (250 or 310) caught between such grinding action. Once degraded or ground away, the shells (202 or 302) release the tracer material (212 or 304), which attaches to the drill cuttings 75 as shown in FIG. 1.

Method 400 can continue at step 410, which includes circulating the drilling fluid including the cuttings with the attached tracer material through the wellbore and uphole toward the terranean surface. For example, as shown in FIG. 1, drill cuttings 75 with attached tracer material 80 (which can be tracer material 212 or 304) is circulated in return drilling fluid 44 up through the annulus 60 to the terranean surface 12.

Method 400 can continue at step 412, which includes analyzing the cuttings with the attached tracer material at the terranean surface through an optical analyzer. For example, once returned to the surface 12, the return drilling fluid 44 can be analyzed by optical analyzer 19 (such as an UV camera with digital image recognition system) to determine a color (for example, fluorescent color) of the tracer material 80 that is attached to the drill cuttings 75. In this manner, a particular subterranean formation, such as subterranean formation 40a, can be identified by the color of the tracer material 80 on the drill cuttings 75.

Method 400 can include additional or alternative steps as well. For example, steps 404-412 (or a subset of such steps) can be performed iteratively depending on a number of subterranean formations through which the drill bit 55 drills and removes drill cuttings 75. For each different or unique subterranean formation (such as formations 40a and 40b), a tracer material 80 of a different fluorescent color can be used in the tracer pills (250 or 310) to uniquely distinguish the drill cuttings 75 (by tracer material color) therefrom. Further, in some aspects, as different subterranean formations can be at different depths in the wellbore 20 (and therefore different wellbore temperatures), the tracer pills (250 or 310) for each different formation can include a shell (202 or 302) of a thermoresponsive material selected to degrade or dissolve at the specific or estimated wellbore temperature of that different formation. Thus, the tracer pills (250 or 310) for each formation may only release the tracer material (212 or 304) at the specific or estimated wellbore temperature for that formation.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A method of identifying drill cuttings, comprising:
   drilling at least a portion of a wellbore from a terranean surface and into a subterranean formation by rotating a drill bit on a drill string;
   during the drilling, circulating a drilling fluid through the drill string and the drill bit, the drilling fluid comprising a plurality of tracer pills, each tracer pill comprising a shell or coating formed of a thermoresponsive material and a tracer material enclosed within the shell, the thermoresponsive material comprising a thermoplastic polymer selected from the group consisting of polyolefin, fluoropolymer, polyvinyl chloride, neoprene, silicone elastomer, and Viton;
   during the drilling, removing cuttings from the subterranean formation with the rotating drill bit such that the cuttings become entrained within the drilling fluid;
   attaching the tracer material of at least some of the plurality of tracer pills to the cuttings entrained within the drilling fluid by releasing the tracer material from the shells by degrading or dissolving the thermoresponsive material of the shells of the at least some of the plurality of tracer pills based on a temperature within the wellbore at the subterranean formation; and
   circulating the drilling fluid including the cuttings with the attached tracer material through the wellbore and uphole toward the terranean surface.

2. The method of claim 1, wherein releasing the tracer material comprises opening the shell of the at least some of the plurality of tracer pills through contact between the at least some of the plurality of tracer pills and at least one of the drill bit or the subterranean formation.

3. The method of claim 2, wherein releasing the tracer material comprises opening the shell of the at least some of the plurality of tracer pills through contact between the at least some of the plurality of tracer pills and at least one of the drill bit or the subterranean formation.

4. The method of claim 2, further comprising analyzing the cuttings with the attached tracer material at the terranean surface through an optical analyzer.

5. The method of claim 2, wherein the plurality of tracer pills are a first plurality of tracer pills, the tracer material is a first tracer material having a first color, and the subterranean formation is a first subterranean formation at a first depth, the method further comprising:
during the drilling, circulating the drilling fluid through the drill string and the drill bit, the drilling fluid comprising a second plurality of tracer pills, each tracer pill comprising a shell or coating formed of the thermoresponsive material and a second tracer material enclosed within the shell, the second tracer material having a second color different than the first color;
during the drilling, removing cuttings from a second subterranean formation with the rotating drill bit such that the cuttings of the second subterranean formation become entrained within the drilling fluid, the second subterranean formation at a second depth different than the first depth;
attaching the second tracer material of at least some of the second plurality of tracer pills to the cuttings from the second subterranean formation entrained within the drilling fluid by releasing the second tracer material from the shells; and
circulating the drilling fluid including the cuttings from the second subterranean formation with the attached second tracer material through the wellbore and uphole toward the terranean surface.

6. The method of claim 5, further comprising:
analyzing the cuttings from the first subterranean formation with the attached first tracer material at the terranean surface through an optical analyzer;
analyzing the cuttings from the second subterranean formation with the attached second tracer material at the terranean surface through the optical analyzer; and
distinguishing the cuttings from the first subterranean formation from the cuttings from the second subterranean formation based on the difference between the first and second colors.

7. The method of claim 5, wherein releasing the first tracer material comprises degrading or dissolving the thermoresponsive material of the shells of the at least some of the first plurality of tracer pills based on a first temperature within the wellbore at the first subterranean formation, and
releasing the second tracer material comprises degrading or dissolving the thermoresponsive material of the shells of the at least some of the second plurality of tracer pills based on a second temperature within the wellbore at the second subterranean formation that is different than the first temperature.

8. The method of claim 1, wherein releasing the tracer material comprises:
opening the shell of the at least some of the plurality of tracer pills through contact between the at least some of the plurality of tracer pills and at least one of the drill bit or the subterranean formation.

9. The method of claim 1, further comprising analyzing the cuttings with the attached tracer material at the terranean surface through an optical analyzer.

10. The method of claim 1, wherein the plurality of tracer pills are a first plurality of tracer pills, the tracer material is a first tracer material having a first color, and the subterranean formation is a first subterranean formation at a first depth, the method further comprising:
during the drilling, circulating the drilling fluid through the drill string and the drill bit, the drilling fluid comprising a second plurality of tracer pills, each tracer pill comprising a shell or coating formed of the thermoresponsive material and a second tracer material enclosed within the shell, the second tracer material having a second color different than the first color;
during the drilling, removing cuttings from a second subterranean formation with the rotating drill bit such that the cuttings of the second subterranean formation become entrained within the drilling fluid, the second subterranean formation at a second depth different than the first depth;
attaching the second tracer material of at least some of the second plurality of tracer pills to the cuttings from the second subterranean formation entrained within the drilling fluid by releasing the second tracer material from the shells; and
circulating the drilling fluid including the cuttings from the second subterranean formation with the attached second tracer material through the wellbore and uphole toward the terranean surface.

11. The method of claim 10, further comprising:
analyzing the cuttings from the first subterranean formation with the attached first tracer material at the terranean surface through an optical analyzer;
analyzing the cuttings from the second subterranean formation with the attached second tracer material at the terranean surface through the optical analyzer; and
distinguishing the cuttings from the first subterranean formation from the cuttings from the second subterranean formation based on the difference between the first and second colors.

12. The method of claim 10, wherein releasing the first tracer material comprises degrading or dissolving the thermoresponsive material of the shells of the at least some of the first plurality of tracer pills based on a first temperature within the wellbore at the first subterranean formation, and
releasing the second tracer material comprises degrading or dissolving the thermoresponsive material of the shells of the at least some of the second plurality of tracer pills based on a second temperature within the wellbore at the second subterranean formation that is different than the first temperature.

13. A system, comprising:
a drilling sub-system configured to drill at least a portion of a wellbore from a terranean surface toward a subterranean formation by rotating a drill bit on a drill string; and
a drilling fluid circulation sub-system configured to perform operations comprising:
during the drilling, circulating a drilling fluid through the drill string and the drill bit, the drilling fluid comprising a plurality of tracer pills, each tracer pill comprising a shell or coating formed of a thermoresponsive material and a tracer material enclosed within the shell, the thermoresponsive material comprising a thermoplastic polymer selected from the group consisting of polyolefin, fluoropolymer, polyvinyl chloride, neoprene, silicone elastomer, and Viton;
during the drilling, removing cuttings from the subterranean formation with the rotating drill bit such that the cuttings become entrained within the drilling fluid;

attaching the tracer material of at least some of the plurality of tracer pills to the cuttings entrained within the drilling fluid by releasing the tracer material from the shells by degrading or dissolving the thermoresponsive material of the shells of the at least some of the plurality of tracer pills based on a temperature within the wellbore at the subterranean formation; and circulating the drilling fluid including the cuttings with the attached tracer material through the wellbore and uphole toward the terranean surface.

14. The system of claim 13, wherein releasing the tracer material comprises opening the shell of the at least some of the plurality of tracer pills through contact between the at least some of the plurality of tracer pills and at least one of the drill bit or the subterranean formation.

15. The system of claim 14, wherein releasing the tracer material comprises opening the shell of the at least some of the plurality of tracer pills through contact between the at least some of the plurality of tracer pills and at least one of the drill bit or the subterranean formation.

16. The system of claim 14, further comprising an optical analyzer configured to analyze the cuttings with the attached tracer material at the terranean surface.

17. The system of claim 14, wherein the plurality of tracer pills are a first plurality of tracer pills, the tracer material is a first tracer material having a first color, and the subterranean formation is a first subterranean formation at a first depth, the drilling fluid circulation sub-system further configured to perform operations comprising:

during the drilling, circulating the drilling fluid through the drill string and the drill bit, the drilling fluid comprising a second plurality of tracer pills, each tracer pill comprising a shell or coating formed of the thermoresponsive material and a second tracer material enclosed within the shell, the second tracer material having a second color different than the first color;

during the drilling, removing cuttings from a second subterranean formation with the rotating drill bit such that the cuttings of the second subterranean formation become entrained within the drilling fluid, the second subterranean formation at a second depth different than the first depth;

attaching the second tracer material of at least some of the second plurality of tracer pills to the cuttings from the second subterranean formation entrained within the drilling fluid by releasing the second tracer material from the shells; and circulating the drilling fluid including the cuttings from the second subterranean formation with the attached second tracer material through the wellbore and uphole toward the terranean surface.

18. The system of claim 17, further comprising an optical analyzer configured to perform operations comprising:

analyzing the cuttings from the first subterranean formation with the attached first tracer material at the terranean surface;

analyzing the cuttings from the second subterranean formation with the attached second tracer material at the terranean surface; and distinguishing the cuttings from the first subterranean formation from the cuttings from the second subterranean formation based on the difference between the first and second colors.

19. The system of claim 17, wherein releasing the first tracer material comprises degrading or dissolving the thermoresponsive material of the shells of the at least some of the first plurality of tracer pills based on a first temperature within the wellbore at the first subterranean formation, and releasing the second tracer material comprises degrading or dissolving the thermoresponsive material of the shells of the at least some of the second plurality of tracer pills based on a second temperature within the wellbore at the second subterranean formation that is different than the first temperature.

20. The system of claim 13, wherein releasing the tracer material comprises:

opening the shell of the at least some of the plurality of tracer pills through contact between the at least some of the plurality of tracer pills and at least one of the drill bit or the subterranean formation.

21. The system of claim 13, further comprising an optical analyzer configured to analyze the cuttings with the attached tracer material at the terranean surface.

22. The system of claim 13, wherein the plurality of tracer pills are a first plurality of tracer pills, the tracer material is a first tracer material having a first color, and the subterranean formation is a first subterranean formation at a first depth, the drilling fluid circulation sub-system further configured to perform operations comprising:

during the drilling, circulating the drilling fluid through the drill string and the drill bit, the drilling fluid comprising a second plurality of tracer pills, each tracer pill comprising a shell or coating formed of the thermoresponsive material and a second tracer material enclosed within the shell, the second tracer material having a second color different than the first color;

during the drilling, removing cuttings from a second subterranean formation with the rotating drill bit such that the cuttings of the second subterranean formation become entrained within the drilling fluid, the second subterranean formation at a second depth different than the first depth;

attaching the second tracer material of at least some of the second plurality of tracer pills to the cuttings from the second subterranean formation entrained within the drilling fluid by releasing the second tracer material from the shells; and circulating the drilling fluid including the cuttings from the second subterranean formation with the attached second tracer material through the wellbore and uphole toward the terranean surface.

23. The system of claim 22, further comprising an optical analyzer configured to perform operations comprising:

analyzing the cuttings from the first subterranean formation with the attached first tracer material at the terranean surface;

analyzing the cuttings from the second subterranean formation with the attached second tracer material at the terranean surface; and distinguishing the cuttings from the first subterranean formation from the cuttings from the second subterranean formation based on the difference between the first and second colors.

24. The system of claim 22, wherein releasing the first tracer material comprises degrading or dissolving the thermoresponsive material of the shells of the at least some of the first plurality of tracer pills based on a first temperature within the wellbore at the first subterranean formation, and releasing the second tracer material comprises degrading or dissolving the thermoresponsive material of the shells of the at least some of the second plurality of tracer pills based on a second temperature within the wellbore at the second subterranean formation that is different than the first temperature.

* * * * *